US012682731B2

(12) United States Patent
Yeh et al.

(10) Patent No.: US 12,682,731 B2
(45) Date of Patent: *Jul. 14, 2026

(54) INTERACTIVE SYSTEMS AND METHODS WITH FEEDBACK DEVICES

(71) Applicant: Universal City Studios LLC, Universal City, CA (US)

(72) Inventors: Wei Cheng Yeh, Orlando, FL (US); Travis Jon Cossairt, Celebration, FL (US)

(73) Assignee: Universal City Studios LLC, Universal City, CA (US)

( * ) Notice: Subject to any disclaimer, the term of this patent is extended or adjusted under 35 U.S.C. 154(b) by 1018 days.

This patent is subject to a terminal disclaimer.

(21) Appl. No.: 17/071,389

(22) Filed: Oct. 15, 2020

(65) Prior Publication Data

US 2021/0027587 A1     Jan. 28, 2021

Related U.S. Application Data

(63) Continuation of application No. 15/882,721, filed on Jan. 29, 2018, now Pat. No. 10,818,152.

(Continued)

(51) Int. Cl.
*G06K 7/10*          (2006.01)
*A63G 31/00*          (2006.01)
(Continued)

(52) U.S. Cl.
CPC .............. *G08B 7/06* (2013.01); *A63G 31/00* (2013.01); *G06K 7/10475* (2013.01);
(Continued)

(58) Field of Classification Search
CPC ...... G08B 7/06; A63G 31/00; G06K 7/10475; G06K 19/0724; G06K 19/07701;
(Continued)

(56) References Cited

U.S. PATENT DOCUMENTS 4,245,216 A * 1/1981 Rintoul ..................... A63F 1/18
273/DIG. 26
4,823,367 A * 4/1989 Kreutzfeld ......... A63B 71/0686
377/5

(Continued)

FOREIGN PATENT DOCUMENTS

CN          102129584 A          7/2011
CN          106462722 A          2/2017
(Continued)

OTHER PUBLICATIONS

PCT/US2018/060820 Search Report and Written Opinion dated Feb. 12, 2019.
(Continued)

*Primary Examiner* — Quan Zhen Wang
(74) *Attorney, Agent, or Firm* — Fletcher Yoder, P.C.

(57) ABSTRACT

A wearable device includes a first radio-frequency identification (RFID) tag, a second RFID tag, one or more feedback devices configured to provide feedback to a guest, and a microcontroller. The microcontroller is configured to generate a first control signal that causes a first type of feedback via the one or more feedback devices in response to interaction between electromagnetic radiation having a first frequency and the first RFID tag and to generate a second control signal that causes a second type of feedback via the one or more feedback devices in response to interaction between electromagnetic radiation having a second frequency and the second RFID tag.

20 Claims, 5 Drawing Sheets

Related U.S. Application Data

(60) Provisional application No. 62/617,506, filed on Jan. 15, 2018.

(51) Int. Cl.

| | |
|---|---|
| *G06K 19/07* | (2006.01) |
| *G06K 19/077* | (2006.01) |
| *G07C 11/00* | (2006.01) |
| *G07F 17/32* | (2006.01) |
| *G08B 7/06* | (2006.01) |

(52) U.S. Cl.
CPC ... *G06K 19/0724* (2013.01); *G06K 19/07701* (2013.01); *G07C 11/00* (2013.01); *G07F 17/3206* (2013.01); *G07F 17/3223* (2013.01); *G07F 17/323* (2013.01); *G07F 17/3239* (2013.01); *G07F 17/3297* (2013.01); *G07C 2011/02* (2013.01)

(58) Field of Classification Search
CPC . G07C 11/00; G07C 2011/02; G07F 17/3206; G07F 17/3223; G07F 17/323; G07F 17/3239; G07F 17/3297
USPC ........................................................ 340/7.58
See application file for complete search history.

(56) References Cited

U.S. PATENT DOCUMENTS

| | | | |
|---|---|---|---|
| 4,932,045 A * | 6/1990 | Kasoff | A63B 71/0686 |
| | | | 377/5 |
| 4,956,775 A * | 9/1990 | Klamer | A63B 71/0669 |
| | | | 473/480 |
| 5,946,444 A | 8/1999 | Evans et al. | |
| 5,979,941 A | 11/1999 | Mosher, Jr. et al. | |
| 6,104,311 A | 8/2000 | Lastinger | |
| 6,142,368 A | 11/2000 | Mullins et al. | |
| 6,219,543 B1 | 4/2001 | Myers et al. | |
| 6,307,952 B1 | 10/2001 | Dietz | |
| 6,346,886 B1 | 2/2002 | De La Huerga | |
| 6,352,205 B1 | 3/2002 | Mullins et al. | |
| 6,362,741 B1 * | 3/2002 | Hickox | G01M 3/20 |
| | | | 340/636.15 |
| 6,474,557 B2 | 11/2002 | Mullins et al. | |
| 6,526,158 B1 | 2/2003 | Goldberg | |
| 6,608,551 B1 | 8/2003 | Anderson et al. | |
| 6,634,949 B1 | 10/2003 | Briggs et al. | |
| 6,680,707 B2 | 1/2004 | Allen et al. | |
| 6,761,637 B2 * | 7/2004 | Weston | A63F 13/92 |
| | | | 463/43 |
| 6,822,569 B1 | 11/2004 | Bellum et al. | |
| 6,825,751 B1 | 11/2004 | Kita et al. | |
| 6,888,502 B2 | 5/2005 | Beigel et al. | |
| 6,908,387 B2 | 6/2005 | Hedrick et al. | |
| 6,967,566 B2 | 11/2005 | Weston et al. | |
| 7,029,400 B2 | 4/2006 | Briggs | |
| 7,047,205 B2 | 5/2006 | Hale et al. | |
| 7,066,781 B2 | 6/2006 | Weston | |
| 7,071,824 B2 | 7/2006 | Trosper | |
| 7,188,764 B2 | 3/2007 | Penuela | |
| 7,204,425 B2 | 4/2007 | Mosher, Jr. et al. | |
| 7,224,967 B2 | 5/2007 | Hale et al. | |
| 7,311,605 B2 | 12/2007 | Moser | |
| 7,327,251 B2 | 2/2008 | Corbett, Jr. | |
| 7,336,178 B2 | 2/2008 | Le | |
| 7,336,185 B2 | 2/2008 | Turner et al. | |
| 7,382,255 B2 * | 6/2008 | Chung | G08B 13/2417 |
| | | | 714/752 |
| 7,385,498 B2 | 6/2008 | Dobosz | |
| 7,396,281 B2 | 7/2008 | Mendelsohn et al. | |
| 7,400,253 B2 | 7/2008 | Cohen | |
| 7,445,550 B2 | 11/2008 | Barney et al. | |
| 7,479,886 B2 | 1/2009 | Burr | |
| 7,488,231 B2 | 2/2009 | Weston | |
| 7,492,254 B2 | 2/2009 | Bandy et al. | |
| 7,500,917 B2 * | 3/2009 | Barney | A63J 21/00 |
| | | | 463/37 |
| 7,528,729 B2 | 5/2009 | Light et al. | |
| 7,541,926 B2 | 6/2009 | Dugan et al. | |
| 7,564,360 B2 | 7/2009 | Cote et al. | |
| 7,564,426 B2 | 7/2009 | Poor et al. | |
| 7,586,413 B2 * | 9/2009 | Davis | G06K 19/0707 |
| | | | 340/572.1 |
| 7,606,540 B2 | 10/2009 | Yoon | |
| 7,614,958 B2 | 11/2009 | Weston et al. | |
| 7,642,921 B2 | 1/2010 | Cutler et al. | |
| 7,674,184 B2 | 3/2010 | Briggs et al. | |
| 7,720,718 B2 | 5/2010 | Hale et al. | |
| 7,739,925 B2 | 6/2010 | Foster | |
| 7,749,089 B1 | 7/2010 | Briggs et al. | |
| 7,752,794 B2 | 7/2010 | Kerlin | |
| 7,768,401 B2 * | 8/2010 | Nagai | G08G 1/14 |
| | | | 340/572.1 |
| 7,775,894 B2 | 8/2010 | Henry et al. | |
| 7,786,871 B2 | 8/2010 | Schwarze et al. | |
| 7,791,557 B2 | 9/2010 | Mickle et al. | |
| 7,802,724 B1 | 9/2010 | Nohr | |
| 7,812,779 B2 | 10/2010 | Turner et al. | |
| 7,817,044 B2 | 10/2010 | Posamentier | |
| 7,837,567 B2 | 11/2010 | Holzberg et al. | |
| 7,843,315 B2 | 11/2010 | Satoh et al. | |
| 7,850,527 B2 | 12/2010 | Barney et al. | |
| 7,855,697 B2 | 12/2010 | Chamarti et al. | |
| 7,878,905 B2 | 2/2011 | Weston et al. | |
| 7,881,713 B2 | 2/2011 | Hale et al. | |
| 7,885,763 B2 | 2/2011 | Havens | |
| 7,896,742 B2 | 3/2011 | Weston et al. | |
| 7,925,308 B2 | 4/2011 | Greene et al. | |
| 7,942,320 B2 | 5/2011 | Joe | |
| 7,956,725 B2 | 6/2011 | Smith | |
| 7,994,910 B2 | 8/2011 | Brooks et al. | |
| 7,997,981 B2 | 8/2011 | Rowe et al. | |
| 8,016,667 B2 | 9/2011 | Benbrahim | |
| 8,035,335 B2 | 10/2011 | Duron et al. | |
| 8,066,192 B2 | 11/2011 | Maus | |
| 8,082,165 B2 | 12/2011 | Natsuyama et al. | |
| 8,085,130 B2 | 12/2011 | Liu et al. | |
| 8,089,458 B2 | 1/2012 | Barney et al. | |
| 8,123,613 B2 | 2/2012 | Dabrowski | |
| 8,164,567 B1 | 4/2012 | Barney et al. | |
| 8,169,406 B2 | 5/2012 | Barney et al. | |
| 8,184,097 B1 | 5/2012 | Barney et al. | |
| 8,200,515 B2 | 6/2012 | Natsuyama et al. | |
| 8,213,862 B2 | 7/2012 | Muth | |
| 8,222,996 B2 | 7/2012 | Smith et al. | |
| 8,226,493 B2 | 7/2012 | Briggs et al. | |
| 8,231,047 B2 | 7/2012 | Canora | |
| 8,237,561 B2 | 8/2012 | Beigel et al. | |
| 8,248,208 B2 | 8/2012 | Renfro, Jr. | |
| 8,248,367 B1 | 8/2012 | Barney et al. | |
| 8,253,533 B2 | 8/2012 | Jones | |
| 8,253,542 B2 | 8/2012 | Canora et al. | |
| 8,284,056 B2 | 10/2012 | McTigue | |
| 8,296,983 B2 | 10/2012 | Padgett et al. | |
| 8,313,381 B2 | 11/2012 | Ackley et al. | |
| 8,330,284 B2 | 12/2012 | Weston et al. | |
| 8,330,587 B2 | 12/2012 | Kupstas | |
| 8,342,929 B2 | 1/2013 | Briggs et al. | |
| 8,353,705 B2 | 1/2013 | Dobson et al. | |
| 8,368,648 B2 | 2/2013 | Barney et al. | |
| 8,373,543 B2 | 2/2013 | Brommer et al. | |
| 8,373,659 B2 | 2/2013 | Barney et al. | |
| 8,384,668 B2 | 2/2013 | Barney et al. | |
| 8,392,506 B2 | 3/2013 | Rowe et al. | |
| 8,416,087 B2 | 4/2013 | Canora et al. | |
| 8,425,313 B2 | 4/2013 | Nelson et al. | |
| 8,430,749 B2 | 4/2013 | Nelson et al. | |
| 8,463,183 B2 | 6/2013 | Muth | |
| 8,475,275 B2 | 7/2013 | Weston et al. | |
| 8,477,046 B2 | 7/2013 | Alonso | |
| 8,489,657 B2 | 7/2013 | Shepherd et al. | |
| 8,491,389 B2 | 7/2013 | Weston et al. | |
| 8,514,069 B2 | 8/2013 | Hadsall, Sr. | |

(56) References Cited

U.S. PATENT DOCUMENTS

| | | | |
|---|---|---|---|
| 8,531,050 B2 | 9/2013 | Barney et al. | |
| 8,552,597 B2 | 10/2013 | Song et al. | |
| 8,564,414 B2 | 10/2013 | Bergevoet | |
| 8,571,905 B2 | 10/2013 | Risnoveanu et al. | |
| 8,581,721 B2 | 11/2013 | Asher et al. | |
| 8,585,852 B2 | 11/2013 | Warther | |
| 8,593,283 B2 | 11/2013 | Smith | |
| 8,593,291 B2 | 11/2013 | Townsend et al. | |
| 8,597,111 B2 | 12/2013 | LeMay et al. | |
| 8,608,535 B2 | 12/2013 | Weston et al. | |
| 8,618,928 B2 | 12/2013 | Weed et al. | |
| 8,621,245 B2 | 12/2013 | Shearer et al. | |
| 8,635,126 B2 | 1/2014 | Risnoveanu et al. | |
| 8,681,000 B2 | 3/2014 | August et al. | |
| 8,682,729 B2 | 3/2014 | Werbitt | |
| 8,686,579 B2 | 4/2014 | Barney et al. | |
| 8,702,515 B2 | 4/2014 | Weston et al. | |
| 8,708,821 B2 | 4/2014 | Barney et al. | |
| 8,711,094 B2 | 4/2014 | Barney et al. | |
| 8,742,623 B1 | 6/2014 | Biederman et al. | |
| 8,753,165 B2 | 6/2014 | Weston | |
| 8,758,136 B2 | 6/2014 | Briggs et al. | |
| 8,773,245 B2 | 7/2014 | Canora et al. | |
| 8,790,180 B2 | 7/2014 | Barney et al. | |
| 8,797,146 B2 | 8/2014 | Cook et al. | |
| 8,810,373 B2 | 8/2014 | Kim et al. | |
| 8,810,430 B2 | 8/2014 | Proud | |
| 8,814,688 B2 | 8/2014 | Barney et al. | |
| 8,816,873 B2 | 8/2014 | Bisset et al. | |
| 8,821,238 B2 | 9/2014 | Ackley et al. | |
| 8,827,810 B2 | 9/2014 | Weston et al. | |
| 8,830,030 B2 | 9/2014 | Arthurs et al. | |
| 8,851,372 B2 | 10/2014 | Zhou et al. | |
| 8,866,673 B2 | 10/2014 | Mendelson | |
| 8,870,641 B2 | 10/2014 | Dabrowski | |
| 8,888,576 B2 | 11/2014 | Briggs et al. | |
| 8,913,011 B2 | 12/2014 | Barney et al. | |
| 8,915,785 B2 | 12/2014 | Barney et al. | |
| 8,917,172 B2 | 12/2014 | Charych | |
| 8,923,994 B2 | 12/2014 | Laikari et al. | |
| 8,924,432 B2 | 12/2014 | Richards et al. | |
| 8,937,530 B2 | 1/2015 | Smith et al. | |
| 8,961,260 B2 | 2/2015 | Weston | |
| 8,961,312 B2 | 2/2015 | Barney et al. | |
| 8,971,804 B2 | 3/2015 | Butler | |
| 8,972,048 B2 | 3/2015 | Canora et al. | |
| 9,002,264 B2 | 4/2015 | Zhang | |
| 9,021,277 B2 | 4/2015 | Shearer et al. | |
| 9,039,533 B2 | 5/2015 | Barney et al. | |
| 9,072,965 B2 | 7/2015 | Kessman et al. | |
| 9,087,246 B1 | 7/2015 | Chin et al. | |
| 9,088,665 B2 | 7/2015 | Boyer et al. | |
| 9,109,763 B1 | 8/2015 | Wein | |
| 9,122,964 B2 | 9/2015 | Krawczewicz | |
| 9,130,651 B2 | 9/2015 | Tabe | |
| 9,138,650 B2 | 9/2015 | Barney et al. | |
| 9,149,717 B2 | 10/2015 | Barney et al. | |
| 9,162,148 B2 | 10/2015 | Barney et al. | |
| 9,162,149 B2 | 10/2015 | Weston et al. | |
| 9,178,569 B2 | 11/2015 | Chakravarty et al. | |
| 9,186,585 B2 | 11/2015 | Briggs et al. | |
| 9,196,964 B2 | 11/2015 | Baringer | |
| 9,207,650 B2 | 12/2015 | Narendra et al. | |
| 9,215,592 B2 | 12/2015 | Narendra et al. | |
| 9,225,372 B2 | 12/2015 | Butler | |
| 9,232,475 B2 | 1/2016 | Heinzelman et al. | |
| 9,245,158 B2 | 1/2016 | Gudan et al. | |
| 9,272,206 B2 | 3/2016 | Weston et al. | |
| 9,314,942 B2 | 4/2016 | Nishino et al. | |
| 9,318,898 B2 | 4/2016 | John | |
| 9,320,976 B2 | 4/2016 | Weston | |
| 9,324,016 B1 * | 4/2016 | Cordes | G06Q 30/01 |
| 9,367,852 B2 | 6/2016 | Canora et al. | |
| 9,383,730 B2 | 7/2016 | Prestenback | |
| 9,393,491 B2 | 7/2016 | Barney et al. | |
| 9,393,500 B2 | 7/2016 | Barney et al. | |
| 9,411,992 B1 | 8/2016 | Marek et al. | |
| 9,412,231 B2 | 8/2016 | Dabrowski | |
| 9,413,229 B2 | 8/2016 | Fleming | |
| 9,424,451 B2 | 8/2016 | Kalhous et al. | |
| 9,438,044 B2 | 9/2016 | Proud | |
| 9,443,382 B2 | 9/2016 | Lyons | |
| 9,446,319 B2 | 9/2016 | Barney et al. | |
| 9,463,380 B2 | 10/2016 | Weston et al. | |
| 9,468,854 B2 | 10/2016 | Briggs et al. | |
| 9,474,962 B2 | 10/2016 | Barney et al. | |
| 9,480,929 B2 | 11/2016 | Weston | |
| 9,483,906 B2 | 11/2016 | LeMay et al. | |
| 9,491,584 B1 | 11/2016 | Mendelson | |
| 9,523,775 B2 | 12/2016 | Chakraborty et al. | |
| 9,542,579 B2 | 1/2017 | Mangold et al. | |
| 9,549,544 B1 * | 1/2017 | Millsap | G08B 21/0247 |
| 9,563,898 B2 | 2/2017 | McMahan et al. | |
| 9,579,568 B2 | 2/2017 | Barney et al. | |
| 9,582,981 B2 | 2/2017 | Rokhsaz et al. | |
| 9,589,224 B2 | 3/2017 | Patterson et al. | |
| 9,600,999 B2 * | 3/2017 | Stenzler | G06V 40/103 |
| 9,613,237 B2 | 4/2017 | Nikunen et al. | |
| 9,616,334 B2 | 4/2017 | Weston et al. | |
| 9,626,672 B2 | 4/2017 | Fisher | |
| 9,642,089 B2 | 5/2017 | Sharma et al. | |
| 9,646,312 B2 | 5/2017 | Lyons et al. | |
| 9,651,992 B2 | 5/2017 | Stotler | |
| 9,661,450 B2 | 5/2017 | Agrawal et al. | |
| 9,675,878 B2 | 6/2017 | Barney et al. | |
| 9,680,533 B2 | 6/2017 | Gudan et al. | |
| 9,692,230 B2 | 6/2017 | Biederman et al. | |
| 9,696,802 B2 | 7/2017 | Priyantha et al. | |
| 9,697,711 B2 | 7/2017 | McIntosh | |
| 9,706,924 B2 | 7/2017 | Greene | |
| 9,707,478 B2 | 7/2017 | Barney et al. | |
| 9,713,766 B2 | 7/2017 | Barney et al. | |
| 9,731,194 B2 | 8/2017 | Briggs et al. | |
| 9,737,797 B2 | 8/2017 | Barney et al. | |
| 9,741,022 B2 | 8/2017 | Ziskind et al. | |
| 9,743,357 B2 | 8/2017 | Tabe | |
| 9,747,538 B2 | 8/2017 | Gudan et al. | |
| 9,748,632 B2 | 8/2017 | Rokhsaz et al. | |
| 9,754,139 B2 | 9/2017 | Chemishkian et al. | |
| 9,754,202 B2 | 9/2017 | Gudan et al. | |
| 9,756,579 B2 | 9/2017 | Zhou et al. | |
| 9,762,292 B2 | 9/2017 | Manian et al. | |
| 9,767,649 B2 | 9/2017 | Dabrowski | |
| 9,770,652 B2 | 9/2017 | Barney et al. | |
| 9,781,953 B2 * | 10/2017 | Verleur | A61M 11/042 |
| 9,813,855 B2 | 11/2017 | Sahadi et al. | |
| 9,814,973 B2 | 11/2017 | Barney et al. | |
| 9,831,724 B2 | 11/2017 | Copeland et al. | |
| 9,836,103 B2 | 12/2017 | Kramer et al. | |
| 9,837,865 B2 | 12/2017 | Mitcheson et al. | |
| 9,861,887 B1 | 1/2018 | Briggs et al. | |
| 9,864,882 B1 | 1/2018 | Geist et al. | |
| 9,867,024 B1 | 1/2018 | Larson | |
| 9,871,298 B2 | 1/2018 | Daniel et al. | |
| 9,909,896 B2 | 3/2018 | Bass et al. | |
| 9,928,527 B2 | 3/2018 | Woycik et al. | |
| 9,928,681 B2 | 3/2018 | LeMay, Jr. et al. | |
| 9,931,578 B2 | 4/2018 | Weston | |
| 9,936,357 B2 | 4/2018 | Mills et al. | |
| 9,949,219 B2 | 4/2018 | Belogolovy | |
| 9,959,435 B1 | 5/2018 | Diorio et al. | |
| 9,972,894 B2 | 5/2018 | Dion et al. | |
| 9,993,724 B2 | 6/2018 | Barney et al. | |
| 10,010,790 B2 | 7/2018 | Weston et al. | |
| 10,022,624 B2 | 7/2018 | Barney et al. | |
| 10,360,419 B1 | 7/2019 | Yeh et al. | |
| 10,537,803 B2 | 1/2020 | Yeh et al. | |
| 10,614,271 B2 | 4/2020 | Cossairt et al. | |
| 10,699,084 B2 | 6/2020 | Yeh et al. | |
| 10,818,152 B2 * | 10/2020 | Yeh | G06K 19/07701 |
| 2002/0082859 A1 | 6/2002 | Lancos et al. | |
| 2003/0189484 A1 * | 10/2003 | Rust | G09B 19/0038 |
| | | | 340/539.23 |
| 2004/0263319 A1 | 12/2004 | Huomo | |

(56)     References Cited

U.S. PATENT DOCUMENTS

| | | | |
|---|---|---|---|
| 2005/0129254 A1 | 6/2005 | Connor et al. | |
| 2005/0200456 A1 | 9/2005 | Bridgelall | |
| 2006/0244592 A1 | 11/2006 | Kansala et al. | |
| 2006/0267737 A1 | 11/2006 | Colby | |
| 2008/0143532 A1 | 6/2008 | Murrah | |
| 2008/0186141 A1* | 8/2008 | Carmeli | G06Q 10/08 |
| | | | 340/10.1 |
| 2008/0186147 A1* | 8/2008 | Carmeli | G06K 19/0723 |
| | | | 340/10.51 |
| 2008/0191882 A1* | 8/2008 | Zhou | G06F 21/79 |
| | | | 340/572.4 |
| 2008/0258917 A1* | 10/2008 | Boyd | A63B 71/0686 |
| | | | 340/572.1 |
| 2008/0301256 A1* | 12/2008 | McWilliams | G06F 12/0806 |
| | | | 714/E11.178 |
| 2009/0106487 A1* | 4/2009 | Kruecken | G06F 13/1668 |
| | | | 711/E12.008 |
| 2009/0124165 A1* | 5/2009 | Weston | A63H 3/00 |
| | | | 446/268 |
| 2010/0019894 A1* | 1/2010 | Okada | G05B 23/0272 |
| | | | 340/506 |
| 2010/0045464 A1* | 2/2010 | Knopf | F16P 3/147 |
| | | | 340/5.1 |
| 2010/0093429 A1* | 4/2010 | Mattice | G07F 17/3232 |
| | | | 463/25 |
| 2010/0308964 A1* | 12/2010 | Ackley | G06K 19/07327 |
| | | | 340/10.1 |
| 2010/0321149 A1* | 12/2010 | Foster | G01G 19/44 |
| | | | 340/5.2 |
| 2011/0109434 A1* | 5/2011 | Hadsall, Sr. | G08B 21/22 |
| | | | 340/8.1 |
| 2011/0118011 A1* | 5/2011 | Filipour | G07F 17/3267 |
| | | | 463/30 |
| 2012/0162436 A1* | 6/2012 | Cordell | H04N 21/23109 |
| | | | 348/158 |
| 2012/0182124 A1 | 7/2012 | Joannes | |
| 2012/0286938 A1 | 11/2012 | Cote et al. | |
| 2012/0319822 A1 | 12/2012 | Hansen | |
| 2013/0231760 A1* | 9/2013 | Rosen | A63F 13/816 |
| | | | 700/91 |
| 2013/0249301 A1 | 9/2013 | Smoot et al. | |
| 2013/0324059 A1 | 12/2013 | Lee et al. | |
| 2014/0122170 A1 | 5/2014 | Padgett et al. | |
| 2014/0135137 A1* | 5/2014 | Heaven | A63G 21/18 |
| | | | 472/117 |
| 2014/0162693 A1 | 6/2014 | Wachter et al. | |
| 2014/0173002 A1* | 6/2014 | Frederick | G06Q 50/01 |
| | | | 709/206 |
| 2014/0244010 A1 | 8/2014 | Harvey et al. | |
| 2014/0244207 A1* | 8/2014 | Hicks | G06Q 10/087 |
| | | | 702/150 |
| 2014/0266585 A1 | 9/2014 | Chao et al. | |
| 2014/0277637 A1* | 9/2014 | Ventura | G01S 15/08 |
| | | | 700/91 |
| 2014/0289626 A1 | 9/2014 | Wu et al. | |
| 2015/0022361 A1* | 1/2015 | Gaisser | H04N 23/13 |
| | | | 340/573.1 |
| 2015/0022366 A1* | 1/2015 | Vu | G09B 19/0038 |
| | | | 340/691.6 |
| 2015/0046202 A1 | 2/2015 | Hunt | |
| 2015/0078140 A1 | 3/2015 | Riobo Aboy et al. | |
| 2015/0087411 A1* | 3/2015 | Gill | G07F 17/3258 |
| | | | 463/27 |
| 2015/0130934 A1 | 5/2015 | Carey | |
| 2015/0133229 A1* | 5/2015 | Weston | A63G 21/18 |
| | | | 472/117 |
| 2015/0138556 A1 | 5/2015 | LeBoeuf et al. | |
| 2015/0194817 A1 | 7/2015 | Lee et al. | |
| 2015/0236551 A1 | 8/2015 | Shearer et al. | |
| 2015/0255226 A1 | 9/2015 | Rouvala et al. | |
| 2015/0312517 A1 | 10/2015 | Hoyt et al. | |
| 2015/0336013 A1 | 11/2015 | Stenzler et al. | |
| 2015/0371194 A1 | 12/2015 | Marshall et al. | |

| | | | |
|---|---|---|---|
| 2016/0019423 A1 | 1/2016 | Ortiz et al. | |
| 2016/0020636 A1 | 1/2016 | Khlat | |
| 2016/0020637 A1 | 1/2016 | Khlat | |
| 2016/0049066 A1* | 2/2016 | Henderson | A61B 8/4427 |
| | | | 340/679 |
| 2016/0067600 A1 | 3/2016 | Barney et al. | |
| 2016/0069931 A1* | 3/2016 | Olivier | G08B 21/24 |
| | | | 340/514 |
| 2016/0092666 A1* | 3/2016 | Padilla | G07C 9/00309 |
| | | | 726/27 |
| 2016/0106174 A1 | 4/2016 | Chung et al. | |
| 2016/0144280 A1 | 5/2016 | Pawlowski et al. | |
| 2016/0170998 A1 | 6/2016 | Frank et al. | |
| 2016/0182165 A1 | 6/2016 | Margon et al. | |
| 2016/0203663 A1 | 7/2016 | Proctor | |
| 2016/0203689 A1* | 7/2016 | Hintz | G08B 13/19608 |
| | | | 348/155 |
| 2016/0217496 A1 | 7/2016 | Tuchman et al. | |
| 2016/0226610 A1 | 8/2016 | Pinzon Gonzales, Jr. | |
| 2016/0275779 A1 | 9/2016 | Hajdenberg | |
| 2016/0307398 A1 | 10/2016 | Walker et al. | |
| 2016/0321548 A1 | 11/2016 | Ziskind et al. | |
| 2016/0331319 A1* | 11/2016 | Kozloski | A61B 5/7282 |
| 2016/0364059 A1* | 12/2016 | Chan | G06F 3/016 |
| 2016/0373522 A1 | 12/2016 | Carlos et al. | |
| 2016/0377758 A1* | 12/2016 | Dorrough | G01V 3/08 |
| | | | 324/672 |
| 2016/0380677 A1* | 12/2016 | Moro | G06K 7/10 |
| | | | 455/41.1 |
| 2017/0011606 A1 | 1/2017 | Ceccon et al. | |
| 2017/0017814 A1 | 1/2017 | Roberts | |
| 2017/0079257 A1* | 3/2017 | Haensgen | H04W 76/14 |
| 2017/0091850 A1 | 3/2017 | Alvarez et al. | |
| 2017/0093463 A1 | 3/2017 | Wang et al. | |
| 2017/0109373 A1* | 4/2017 | Sung | H04L 67/566 |
| 2017/0111750 A1* | 4/2017 | Shiotani | H04R 29/008 |
| 2017/0115018 A1 | 4/2017 | Mintz | |
| 2017/0132438 A1 | 5/2017 | Cletheroe et al. | |
| 2017/0162006 A1 | 6/2017 | Sahadi et al. | |
| 2017/0169449 A1 | 6/2017 | Heaven et al. | |
| 2017/0178512 A1* | 6/2017 | Kannon | B60Q 9/008 |
| 2017/0186270 A1 | 6/2017 | Acres | |
| 2017/0201003 A1 | 7/2017 | Ackley et al. | |
| 2017/0228804 A1 | 8/2017 | Soni et al. | |
| 2017/0235369 A1 | 8/2017 | Acer et al. | |
| 2017/0237466 A1 | 8/2017 | Carr | |
| 2017/0270734 A1 | 9/2017 | Geraghty et al. | |
| 2017/0288735 A1 | 10/2017 | Zhou et al. | |
| 2017/0293985 A1 | 10/2017 | Deria et al. | |
| 2017/0331509 A1 | 11/2017 | Gollakota et al. | |
| 2017/0340961 A1 | 11/2017 | Weston et al. | |
| 2017/0348582 A1* | 12/2017 | Cho | A63B 69/40 |
| 2017/0348593 A1 | 12/2017 | Barney et al. | |
| 2017/0358957 A1 | 12/2017 | Mitcheson et al. | |
| 2017/0361236 A1 | 12/2017 | Barney et al. | |
| 2017/0373526 A1 | 12/2017 | Huang et al. | |
| 2018/0007756 A1* | 1/2018 | Hong | B60Q 1/2607 |
| 2018/0008897 A1* | 1/2018 | Ackley | A63F 13/211 |
| 2018/0014385 A1 | 1/2018 | Wein | |
| 2018/0078853 A1 | 3/2018 | Barney et al. | |
| 2018/0214769 A1 | 8/2018 | Briggs et al. | |
| 2018/0250575 A1* | 9/2018 | Devaux | A63F 13/245 |
| 2018/0261067 A1* | 9/2018 | Bostick | G06F 3/011 |
| 2018/0318723 A1 | 11/2018 | Weston | |
| 2018/0339226 A1 | 11/2018 | Barney et al. | |
| 2019/0087705 A1 | 3/2019 | Bourque et al. | |
| 2019/0220634 A1 | 7/2019 | Cossairt et al. | |
| 2019/0220635 A1 | 7/2019 | Yeh et al. | |
| 2019/0220636 A1 | 7/2019 | Yeh et al. | |
| 2020/0043300 A1 | 2/2020 | Grom | |
| 2022/0016364 A1* | 1/2022 | Kilger | A61M 11/042 |
| 2023/0018372 A1* | 1/2023 | Ackmann | G05B 15/02 |

FOREIGN PATENT DOCUMENTS

| | | | |
|---|---|---|---|
| JP | 2001187611 A | 7/2001 |
| JP | 2001229263 A | 8/2001 |
| JP | 2002288068 A | 10/2002 |

(56) References Cited

FOREIGN PATENT DOCUMENTS

| | | | |
|---|---|---|---|
| JP | 2003006749 | A | 1/2003 |
| JP | 2003288472 | A | 10/2003 |
| JP | 2004126791 | A | 4/2004 |
| JP | 2005267179 | A | 9/2005 |
| JP | 2006023951 | A | 1/2006 |
| JP | 2006023963 | A | 1/2006 |
| JP | 2006277482 | A | 10/2006 |
| JP | 2010000178 | A | 1/2010 |
| JP | 2010140464 | A | 6/2010 |
| JP | 2012244846 | A | 12/2012 |
| JP | 2013188019 | A | 9/2013 |
| JP | 2014006591 | A | 1/2014 |
| JP | 2015194930 | A | 11/2015 |
| JP | 6152919 | B1 | 6/2017 |
| RU | 2607725 | C1 | 1/2017 |
| TW | M503630 | U | 6/2015 |
| WO | 2008121856 | A1 | 10/2008 |
| WO | 2017025628 | A1 | 2/2017 |

OTHER PUBLICATIONS

RU 2020127281 Office Action mailed Mar. 5, 2022.
EP Extended European Search Report for European Application No. 23158633.0 mailed May 17, 2023.
JP Office Action for Japanese Application No. 2020-537637 mailed Nov. 9, 2022.
JP Office Action for Japanese Application No. 2023-072608 mailed Apr. 30, 2024.
CN Office Action for Chinese Application No. 201880086631.6 mailed Mar. 18, 2025.
CN Office Action for Chinese Application No. 201880086631.6 mailed Jun. 23, 2025.
JP Office Action for Japanese Application No. 2024-162020 mailed Oct. 2, 2025.

* cited by examiner

_80_

RECEIVE ELECTROMAGNETIC RADIATION — 82

HARVEST POWER — 84

POWER MCU — 86

MCU RECEIVES SIGNAL FROM RFID TAG — 88

MCU OUTPUTS CONTROL SIGNAL
TO ONE OR MORE FEEDBACK DEVICES — 90

FEEDBACK
DEVICE PROVIDES FEEDBACK RESPONSE — 92

INTERACTIVE SYSTEMS AND METHODS WITH FEEDBACK DEVICES

CROSS-REFERENCE TO RELATED APPLICATIONS

This application is a continuation of U.S. Non-Provisional application Ser. No. 15/882,721, entitled "INTERACTIVE SYSTEMS AND METHODS WITH FEEDBACK DEVICES," filed Jan. 29, 2018, which claims priority from and the benefit of U.S. Provisional Application No. 62/617, 506, entitled "INTERACTIVE SYSTEMS AND METHODS WITH FEEDBACK DEVICES," filed Jan. 15, 2018. These applications are hereby incorporated by reference in their entirety for all purposes.

FIELD OF DISCLOSURE

The present disclosure relates generally to interactive systems and methods. More specifically, embodiments of the present disclosure relate to interactive systems and methods that utilize a wearable device to provide feedback to a guest in an amusement park.

BACKGROUND

Amusement parks and/or theme parks may include various entertainment attractions. Some existing attractions may provide guests with an immersive or interactive experience. For example, guests may visit areas having various features, such as audio, video, and special effects. With the increasing sophistication and complexity of modern attractions, and the corresponding increase in expectations among amusement park and/or theme park guests, improved and more creative attractions are needed, including attractions that provide a more interactive and personalized experience.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a wearable device includes a first radio-frequency identification (RFID) tag, a second RFID tag, one or more feedback devices configured to provide feedback to a guest, and a microcontroller configured to generate a first control signal that causes a first type of feedback via the one or more feedback devices in response to interaction between electromagnetic radiation having a first frequency and the first RFID tag and to generate a second control signal that causes a second type of feedback via the one or more feedback devices in response to interaction between electromagnetic radiation having a second frequency and the second RFID tag.

In one embodiment, a system includes a wearable device having a first radio-frequency identification (RFID) tag with a first memory that stores respective identification information. The system also includes a first reader configured to transmit electromagnetic radiation having a first frequency that enables the first reader to read the respective identification information from the first memory and to write data to the first memory of the first RFID tag. The system further includes one or more light emitters supported by the wearable device and a microcontroller supported by the wearable device. The microcontroller is configured to receive at least one of a first signal indicative of receipt of the transmitted electromagnetic radiation at the first RFID tag and a second signal indicative of the data written to the first memory, and the microcontroller is configured to generate a control signal that causes at least one of the one or more light emitters to illuminate based on the received first signal or the received second signal.

In one embodiment, a method includes transmitting electromagnetic radiation having a first frequency from a first reader, and transmitting identification information from a first radio-frequency identification (RFID) tag supported by a wearable device to the first reader in response to receipt of the transmitted electromagnetic radiation having the first frequency. The method also includes receiving, at a microcontroller supported by the wearable device, a first signal from the first RFID tag that indicates receipt of the electromagnetic radiation comprising the first frequency at the first RFID tag. The method further includes generating a first control signal, using the microcontroller, in response to receipt of the first signal at the microcontroller, wherein the first control signal causes one of a plurality of available types of illumination of one or more light emitters supported by the wearable device.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
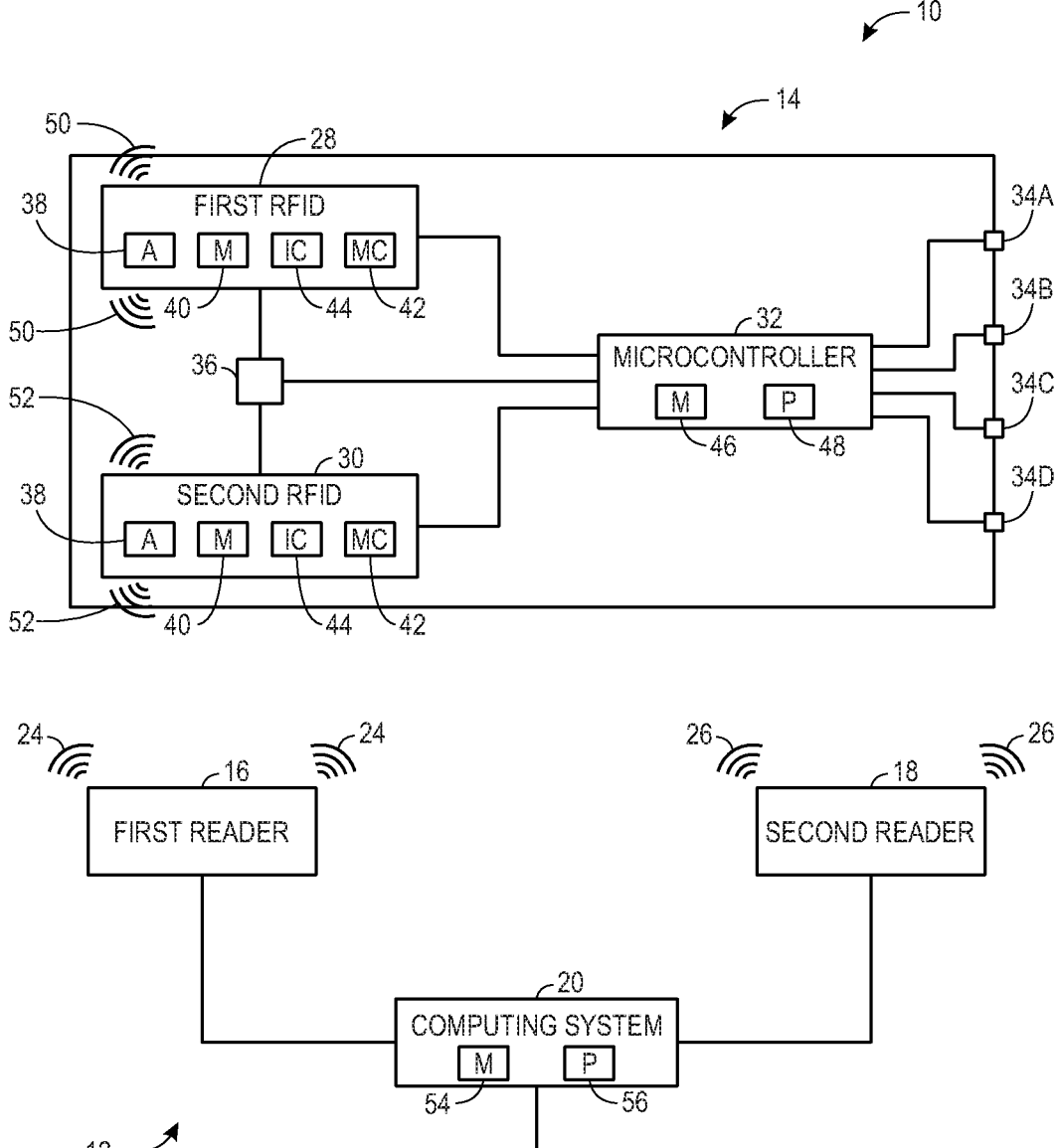
FIG. 1 is a schematic diagram of an interactive system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Amusement parks feature a wide variety of entertainment, such as amusement park rides, performance shows, and games. The different types of entertainment may include features that enhance a guest's experience at the amusement park. For example, a game may detect a guest's interaction with rendered images that are shown on a display screen. However, some interactive systems may provide a suboptimal experience due to a lack of feedback to notify the guest that an interaction is successful (e.g., recognized by the interactive system). Furthermore, some interactive systems may not determine an identity of the guest that interacted with the interactive element, and thus, may not accurately or efficiently track points or other game statistics for each guest. Thus, it may be desirable to provide systems and methods that provide feedback to the guest to indicate to the guest that the interactions are actually detected by the interactive system and/or that track game statistics for each guest.

Accordingly, the present disclosure relates to systems and methods that utilize radio-frequency identification (RFID) to provide feedback to a guest based on the guest's interactions with an interactive system. More particularly, the present disclosure relates to an interactive system that includes one or more RFID readers and multiple wearable devices each having one or more RFID tags and one or more feedback devices (e.g., lights) that cooperate to indicate a successful interaction with an interactive element of an attraction. The components of the interactive system disclosed herein may also facilitate tracking of the guest's interactions and progress (e.g., game statistics) as the guest travels through the attraction.

As used below, the term "user" may refer to a user of the interactive system, and the user may be a guest at an amusement park. By way of example, a user may wear or carry the wearable device having the one or more feedback devices as the user travels through an attraction. The attraction may have various interactive elements, which may be any of a variety of images or objects (e.g., rendered images, virtual elements, or graphical elements presented on a display screen; physical targets; costumed characters). To experience the attraction, the user may interact with the interactive elements, such as by touching a physical target or approaching a costumed character, for example.

One or more RFID readers of the interactive system may be positioned at various locations about the attraction and/or proximate to certain interactive elements. In operation, the one or more RFID readers communicate with the one or more RFID tags within the wearable device of the user. The communication between the one or more RFID readers and the one or more RFID tags may trigger a feedback response via the one or more feedback devices (e.g., illuminate a light) of the wearable device, thereby providing feedback to notify the user that the interactive system has detected the user within the attraction and/or has detected the user's interaction with an interactive element, for example. The communication between the one or more RFID readers and the one or more RFID tags may also enable the interactive system to track the user's progress (e.g., game statistics) as the user travels through the attraction. For example, the interactive system may detect and keep track of the number of targets contacted by the user and/or the number of costumed characters met by the user.

Furthermore, in one embodiment, the interactive system may provide feedback indicative of the user's status (e.g., level within the game) via the one or more feedback devices of the wearable device. For example, upon reaching a certain number of points or an advanced level in the game, the one or more RFID readers may write data to the one or more RFID tags within the wearable device that trigger a feedback response via the one or more feedback devices (e.g., illuminate multiple lights). Thus, the interactive system may provide substantially immediate feedback when the user interacts with interactive elements of the attraction and/or when the user reaches certain levels (e.g., milestones or achievements). Furthermore, the interactive system may enable the user to receive such feedback without the need to refer to external devices, such as a mobile phone or kiosk, thereby providing a more immersive and enjoyable experience.

Turning now to the drawings, FIG. 1 is a schematic representation of an interactive system 10 including a reader system 12 (e.g., radio-frequency identification [RFID] reader system) and a wearable device 14. In one embodiment, the wearable device 14 is a wearable or portable device, such as a bracelet, necklace, charm, pin, or toy that may be worn or carried by a user as the user travels through an attraction. As discussed in more detail below, the reader system 12 is capable of communicating with the wearable device 14 through electromagnetic radiation, and the communication enables tracking of the user's progress through the attraction (e.g., number of rides completed, areas visited, interactive elements contacted, costumed characters met, virtual achievements won). The communication also enables the wearable device 14 to provide feedback indicative of the progress and/or various interactions to the user through a feedback response (e.g. light, sound, or haptics) output by the wearable device 14.

As illustrated in FIG. 1, one embodiment of the reader system 12 includes a first reader 16 and a second reader 18 that are communicatively coupled to a computing system 20 (having a memory 54 and a processor 56) that accesses information stored in one or more databases 22 (e.g., cloud-based storage system.) Generally, the first reader 16 and the second reader 18 transmit electromagnetic radiation (e.g., signals) to the wearable device 14. In one embodiment, the first reader 16 transmits signals 24 of one frequency (e.g., range) and the second reader 18 transmits signals 26 of another frequency (e.g., range) that is different from the first frequency. In addition to transmitting signals 24, 26, the first reader 16 and the second reader 18 can receive signals, such as signals returned from the wearable device 14 and signals from the computing system 20. In one embodiment, the computing system 20 instructs the readers (e.g., the first reader 16 and the second reader 18) to send signals 24, 26 to the wearable device 14 based on information stored in data encoded in the one or more databases 22. Thus, it should be appreciated that the first reader 16 and the second reader 18 may be transceivers that are capable of both sending and receiving signals.

As illustrated in FIG. 1, one embodiment of the wearable device 14 includes a first RFID tag 28, a second RFID tag 30, a microcontroller 32, one or more light emitting diodes (LEDs) 34a, 34b, 34c, 34d, and power circuitry 36 that cooperate to enable the wearable device 14 of the interactive system 10 to function as disclosed. As illustrated, the wearable device 14 has four LEDs 34; however, it should be appreciated that the wearable device 14 may have fewer or more LEDs 34. The first RFID tag 28 and the second RFID tag 30 each include an antenna 38 that transmits and receives signals, a memory 40 storing information (e.g., unique identification code), a microchip 42, and an integrated circuit 44 to power the microchip 42. Additionally, the integrated circuit 44 powers the power circuitry 36, which provides power to the microcontroller 32. In one embodiment, the power circuitry 36 may include an energy storage device (e.g., capacitor, super capacitor, or battery) configured to store power. As shown, the microcontroller 32 of the wearable device 14 includes a memory 46 and a processor 48. The memory 46 stores computer-readable instructions that are executed by the processor 48 to control operation of the microcontroller 32.

In general, the antennae 38 of the first RFID tag 28 is designed to receive signals 24 from the first reader 16, and the antenna 28 of the second RFID tag 30 is designed to receive signals 26 from the second reader 18 of the reader system 12. The microcontroller 32 identifies interactions between the tags 28, 30 and the readers 16, 18 and sends signals (e.g., control signals) to one or more of the LEDs 34 to provide feedback to the user. In one embodiment, the wearable device 14 of the interactive system 10 may contain additional or alternative feedback devices, such as audio devices configured to emit sound or haptics configured to provide a tactile output (e.g., vibration). Additionally or alternatively, backscatter indicative of a unique identification code is emitted by the first RFID tag 28 and/or the second RFID tag 30, and the backscatter is utilized by the computing system to track the user's progress (e.g., game statistics) as the user travels through the attraction.

More particularly, the first reader 16 of the reader system 12 continuously transmits signals 24. The antenna 38 of the first RFID tag 28 is configured to receive electromagnetic radiation (e.g., signals 24) from the first reader 16, as well as transmit signals 50 to the first reader 16. The integrated circuit 44 converts the electromagnetic radiation received by the antenna 38 into electricity to provide power to the microchip 42, which generates a backscatter (e.g., signal 50). The backscatter contains information (e.g., unique identification code) stored in the memory 40 of the first RFID tag 28. The backscatter (e.g., signal 50) is received by the first reader 16, which may send a signal to the computing system 20. The computing system 20 may process the signal to determine the identity of the user associated with the wearable device 14 (e.g., the user may register the wearable device 14 to associate the wearable device 14 with the user prior to experiencing the attraction) and/or to update information (e.g., game statistics) for the wearable device 14 in the one or more databases 22. In this manner, the interactive system 10 may track the user's progress (e.g., game statistics) as the user travels through the attraction.

Furthermore, once power is supplied to the microcontroller 32, the processor 48 of the microcontroller 32 may also receive and process a signal from the first RFID tag 28 that indicates that the signal 24 from the first reader 16 was received at the first RFID tag 28. The processor 48 of the microcontroller 32 may then execute instructions stored on the memory 46 of the microcontroller 32 to illuminate one or more of the LEDs 34a, 34b, 34c, 34d to provide feedback to the user. In one embodiment, the microcontroller 32 may be programmed to provide a certain type of illumination (e.g., number of lights, color, blinking pattern, length of time) in response to the signal that indicates that the signal 24 from the first reader 16 was received at the first RFID tag 28. For example, when the first RFID tag 28 receives the signal 24 from the first RFID reader 16, the microcontroller 32 may cause a first LED 34a to illuminate. In one embodiment, the signals 24 transmitted by the first reader 16 are ultra-high frequency (UHF) signals (e.g., having a frequency between approximately 300 megahertz and 3 gigahertz). As such, the first RFID tag 28 may receive signals 24 from the first reader 16 when the first RFID tag 28 is located a relatively far distance (e.g., up to approximately 3, 4, 5, 6, 7, 8, or more meters) away from the first reader 16.

Additionally, the second reader 18 may continuously transmit signals 26. The antenna 38 of the second RFID tag 30 is configured to receive electromagnetic radiation (e.g., signals 26) from the second reader 18. The integrated circuit 44 converts the radiation received by the antenna 38 into electricity to provide power to the microchip 42, which generates a backscatter (e.g., signal 52). The backscatter contains information (e.g., unique identification code) stored in the memory 40 of the second RFID tag 30. It should be appreciated that in some embodiments, the information stored in the respective memories 40 of the first RFID tag 28 and the second RFID tag 30 may be linked (e.g., the backscatter generated in response to receipt of the signals 26 at the second RFID tag 30 may contain the information stored in the memory 40 of the first RFID tag 28), or the first RFID tag 28 and the second RFID tag 30 may share one memory 40 (e.g., be a dual RFID tag capable of receiving different frequency signals). The backscatter (e.g., signal 52) is received by the second reader 18, which may send a signal to the computing system 20. The computing system 20 may process the signal to determine the identity of the user associated with the wearable device 14 and/or to update information (e.g., game statistics) for the wearable device 14 in the one or more databases 22. Because the first RFID reader 16 may be associated with a particular area (e.g., room) of the attraction and the second RFID reader 18 may be associated with a particular interactive element (e.g., target) of the attraction, the computing system 20 may track both the general location of the user, as well as the user's interactions with the interactive elements. In this manner, the interactive system 10 may track the user's progress (e.g., game statistics) as the user travels through the attraction.

Furthermore, once power is supplied to the microcontroller 32, the processor 48 of the microcontroller 32 may also receive and process a signal from the second RFID tag 30 that indicates that the signal 26 from the second reader 18 was received at the second RFID tag 30. The processor 48 of the microcontroller 32 may then execute instructions stored on the memory 46 of the microcontroller 32 to illuminate one or more of the LEDs 34a, 34b, 34c, 34d to provide feedback to the user. In one embodiment, the microcontroller 32 may be programmed to provide a certain type of illumination (e.g., number of lights, color, blinking pattern, length of time) in response to the signal that indicates that the signal 26 from the second reader 18 was received at the second RFID tag 30. For example, when the second RFID tag 30 receives the signal 26 from the second RFID reader 18, the microcontroller 32 may cause a second LED 34b to illuminate. In one embodiment, the signals 26 transmitted by the second reader 16 are near-field communication (NFC) signals (e.g., having a frequency between approximately 10 to 20 megahertz). As such, the second RFID tag 30 may receive signals 26 from the second reader 18 when the second RFID tag 30 is within a relatively short distance (e.g., approximately 1, 2, 3, 4, or 5 centimeters) of the first reader 16. Because the first RFID reader 16 may be associated with a particular area (e.g., room) of the attraction and the second RFID reader 18 may be associated with a particular interactive element (e.g., target) of the attraction, the illumination (or other feedback, such as audio or haptics) on the wearable device 14 may provide multiple types of feedback to the user. For example, illumination of the first LED 34*a* in response to receipt of the signals 24 from the first RFID reader 16 may notify the user that the interactive system 10 has detected the user within the particular area of the attraction, while illumination of the second LED 34*b* in response to receipt of the signals 26 from the second RFID reader 18 may notify the user that the interactive system 10 has detected the user's interaction with the particular interactive element.

In general, the second reader 18 operates similarly to the first reader 16; however, the first reader 16 communicates with the first RFID tag 28 (and not the second RFID tag 30), while the second reader 18 communicates with the second RFID tag 30 (and not the first RFID tag 28). The wearable device 14 includes at least two RFID tags 28, 30 that are each configured to communicate with respective readers 16, 18 that transmit signals 24, 26 that travel different distances. The first RFID tag 28 and the first reader 16 that communicate over a relatively long distance enable tracking a general location of the wearable device 14 and charging the wearable device 14, while the second RFID tag 30 and the second reader 18 that communicate over a relatively short distance enable monitoring interactions based on a contact (or close proximity) between the user and interactive elements in the attraction.

In one embodiment, the interactive system 10 may include multiple first readers 16 at different locations within an attraction. As a user moves through the attraction, the user's location is updated in the database 22 based on which first reader 16 is currently communicating with the wearable device 14. In one embodiment, feedback may be provided to the user based on each interaction with each one of the first readers 16. For example, one first reader 16 may be positioned at an entrance of the attraction, and another first reader 16 may be positioned in a room or area of the attraction. In this case, the wearable device 14 provides feedback (e.g., illumination of the first LED 34*a*) upon the user entering the attraction, thereby notifying the user that they have been detected by the interactive system 10. Then, once the user enters the room or area, the wearable device 14 provides another feedback (e.g., the same feedback or a different feedback, such as illumination of the second LED 34*b*), thereby notifying the user that they have been detected by the interactive system 10 as being within the new area.

In one embodiment, one or more first readers 16 and one or more second readers 18 may cooperate to improve the user's immersive experience. For example, the user may enter an area containing one or more first readers 16. The area may include one or more targets each associated with or proximate to one or more second readers 18. As discussed above, once the wearable device 14 is within a range (e.g., a relatively long range) of one first reader 16 in the area, the wearable device 14 communicates with the one first reader 16, the database 22 is updated, and the wearable device 14 may provide feedback to the user that they have been detected within the area. Additionally, once the wearable device 14 is within a range (e.g., a relatively short range) of one second reader 18 (e.g., due to the user hitting, touching, or walking by the target associated with the one second reader 18), the wearable device 14 communicates with the one second reader 18, the database 22 is updated, and the wearable device 14 may provide feedback to the user that they have successfully interacted with the target (e.g., points have been assigned).

As discussed above, the microcontroller 32 may be programmed to provide some feedback to the user based on interactions between the RFID tags 28, 30 of the wearable device 14 and the readers 16, 18. Additionally or alternatively, the memory 40 of the wearable device 14 may be updated (e.g., one or more of the readers 16, 18 may write to the memory 40 of one or more RFID tags 28, 30), thereby enabling the wearable device 14 to provide other feedback, such as feedback indicative of the user's progress (e.g., level within a game), wait times, or the like. For example, upon detecting the user's first interaction with the second reader 18, the computing system 20 may instruct the first reader 16 to write data to the respective memory 40 of the first RFID tag 28 that cause the microcontroller 32 (e.g., when received and processed by the microcontroller 32) to illuminate the first LED 34*a*. However, upon determining that the user has completed a predetermined number of successful interactions with targets (e.g., based on communications between the second RFID tag 30 and the second readers 18 associated with the targets), the computing system 20 may instruct the first reader 16 to write data to the respective memory 40 of the first RFID tag 28 that cause the microcontroller 32 to illuminate multiple LEDs (e.g., LEDs 34*a-d*, or any combination thereof) and/or trigger a feedback response via a speaker or haptics. Thus, feedback is provided based on information stored in the database 22. For example, the database 22 may contain information about the user's progress based on their interactions with one or more first readers 16 and second readers 18 throughout the attraction, and the feedback may be provided once certain conditions are met (e.g., level or points achieved). In this way, the wearable device 14 may provide feedback indicative of the user's overall progress or performance.

In one embodiment, the user may prompt or request the feedback by entering a particular area (e.g., a status update area) having one or more first readers 16. Communication between one of these first readers 16 and the first RFID tag 28 of the wearable device 14 may cause the computing system 20 to instruct the first reader 16 to write the data to the respective memory 40 of the first RFID tag 28 to provide the feedback indicative of the user's progress. In one embodiment, the user may receive such feedback indicative of the user's progress each time the first RFID tag 28 communicates with one first reader 16 and/or one second reader 18. Thus, the user may be repeatedly updated regarding the progress as the user travels through the attraction.

In one embodiment, the LEDs 34*a-d* may be used to provide an indication of a wait time for an attraction. For example, upon detecting that the user is approaching the attraction (e.g., based on communications between the first RFID tag 28 and the first reader 16 proximate to an entrance of the attraction), the computing system 20 may instruct the first reader 16 to write data to the respective memory 40 of the first RFID tag 28 that cause the microcontroller 32 (e.g., when received and processed by the microcontroller 32) to illuminate the LEDs 34*a-d* in a manner that conveys the wait time or whether a certain wait time threshold is met. For example, at least one LED 34 may be multi-colored (e.g., configured to emit red, yellow, and green light), and each color indicates an approximate wait time (e.g., a first color indicates a wait time greater than 15 minutes, a second color indicates a wait time less than 5 minutes, and a third color indicates no wait). Because multiple first readers 16 may be located throughout the attraction or amusement park, the user may continue to receive feedback about the wait time (e.g., because other first readers 16 may write data to the respective memory 40 of the first RFID tag 28) even after the user moves out of the range of the first reader 16 that is proximate to the entrance of the attraction. In one embodiment, each LED 34 may represent an approximate wait time (e.g., 5, 10, 15 minutes), such that the number of LEDs 34 illuminated provides an indication of the wait time (e.g., four LED's indicates a wait time of 60 minutes or more, three LED's indicates a wait time of 45 minutes or more, two LED's indicates a wait time of 30 minutes or more, and one LED indicates a wait time of 15 minutes or more). In one embodiment, the LEDs 34 may represent a countdown timer. For example, upon detecting that the user is approaching the attraction, all LEDs 34*a-d* are initially illuminated and then are sequentially turned off as the countdown timer runs out.

As noted above, in one embodiment, the antenna 38 of the first RFID tag 28 may only receive UHF waves, while the antenna 38 of the second RFID tag 30 may only receive NFC waves. For example, the first RFID tag 28 may only communicate (e.g., receive or transmit) with UHF waves, and the second RFID tag 30 may only communicate with NFC waves. As UHF signals travel a longer distance, the first RFID tag 28 may frequently or continuously receive the UHF signals emitted by the first readers 16 as the user travels through the attraction, but the second RFID tag 30 may only receive the NFC signals emitted by the second readers 18 when the user positions the wearable device 14 close to the second readers 18. Thus, in one embodiment, the UHF signal may be used for powering or charging the wearable device 14 (e.g., via power harvesting by the integrated circuit 44 and power circuitry 36). However, the NFC signal may also be used for powering or charging the wearable device 14 in a similar manner.

It should be appreciated that the interactive system 10 may track multiple users and provide feedback on multiple wearable devices 14. For example, multiple users may each wear a respective wearable device 14 that is configured to communicate with multiple first readers 16 and second readers 18 disposed in different locations within the attraction. It should also be appreciated that in one embodiment, the wearable device 14 of the interactive system 10 may include a single RFID tag (e.g., a dual-frequency RFID tag) that is capable of communicating with signals of a first frequency (e.g., a range of frequencies) and signals of a second frequency (e.g., another range of frequencies) to facilitate the techniques disclosed herein.

Figure 2:
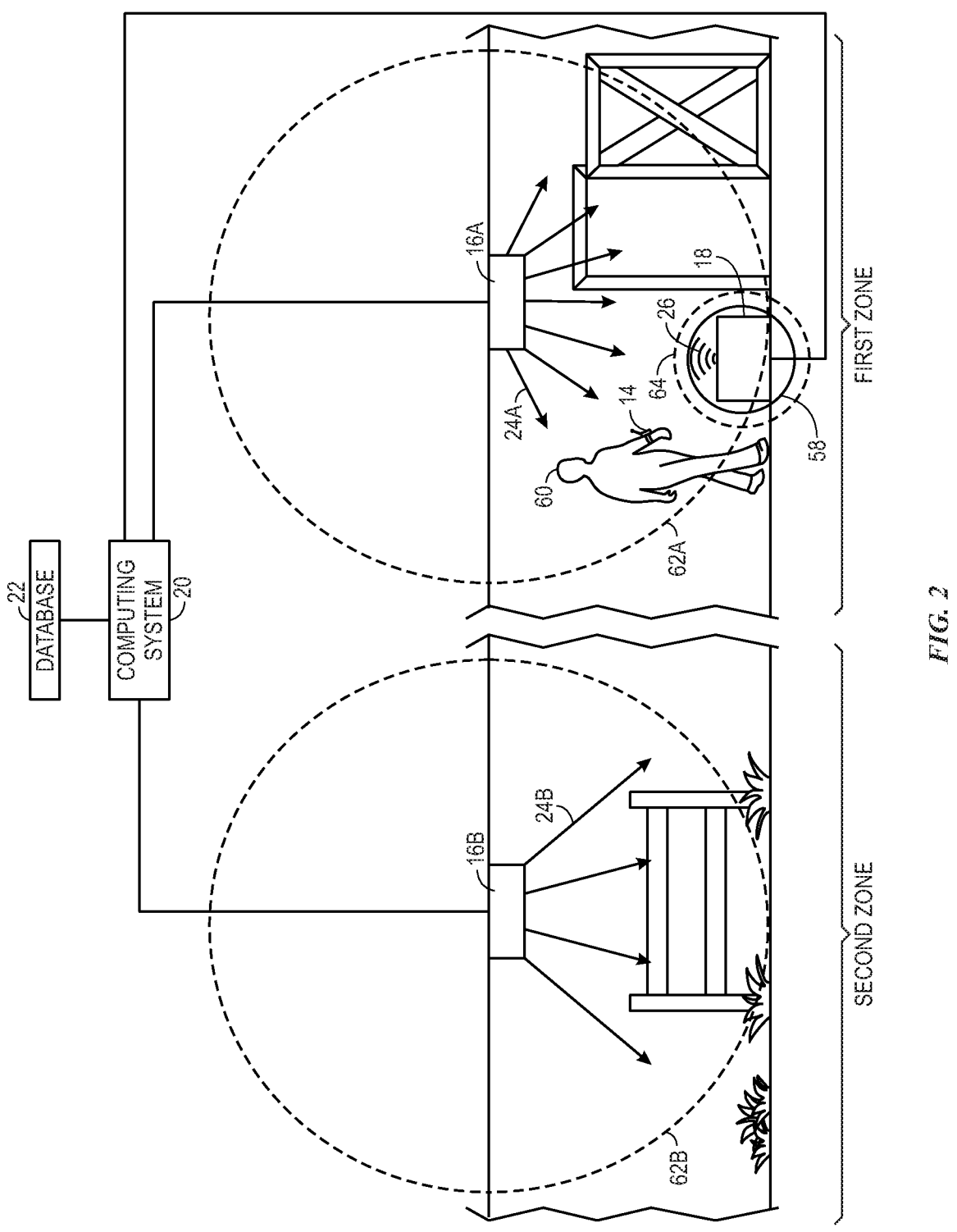
FIG. 2 is an illustration showing communication between a reader and a wearable device that may be used in the interactive system of FIG. 1, in accordance with an embodiment of the present disclosure.

FIG. 2 is an illustration of one embodiment of the interactive system 10. As illustrated, the interactive system 10 includes two first readers 16*a* and 16*b*, the second reader 18 disposed within or proximate to a target 58, and the wearable device 14 worn by a user 60. The first readers 16*a* and 16*b* and the second reader 18 are communicatively coupled to the computing system 20 and the database 22. The first reader 16*a* continuously emits a signal 24*a* that may be received by the first RFID tag 28 of the wearable device 14 within a first area 62*a* (e.g., zone or room of an attraction), and similarly, the first reader 16*b* continuously emits a signal 24*b* that may be received by the first RFID tag 28 of the wearable device 14 within a second area 62*b* once the user 60 travels into the second area 62*b*. As such, depending on the location of the user 60, the wearable device 14 may communicate (e.g., receive signals/electromagnetic radiation, backscatter information) with one or both of the first reader 16*a* in the first area 62*a* or the first reader 16*b* in the second area 62*b*. Based on which first reader (e.g., 16*a* or 16*b*) communicates with the wearable device 14, the computing system 20 determines the location of the user 60 and updates the database 22 with data indicative of the location of the user 60. Additionally, as the wearable device 14 of the user 60 communicates with the first reader 16*a* or the first reader 16*b*, power is harvested and provided to the microcontroller 32. Thus, the microcontroller 32 begins to process signals received from the first RFID tag 28 and/or read data written to the memory 40 of the first RFID tag 28. For example, the microcontroller 32 may receive a signal from the first RFID tag 28 that indicates that the first RFID tag 28 has communicated with one of the first readers 16 and may provide a corresponding feedback response (e.g., illuminate one or more LEDs). As noted above, the first RFID tag 28 may receive a signal from the first reader 16 that writes data to the memory 40 of the first RFID tag 28 that causes the microcontroller 32 to provide a particular feedback response.

As shown in FIG. 2, the second reader 18 is disposed within or proximate to the target 58. The target 58 may be any variety of objects or features within the attraction. In one embodiment, the target 58 is a stationary physical object; however, the target 58 may be a virtual object (e.g., image, virtual element, graphical element on a display screen) or a movable object, such as a costumed character traveling about the attraction. The second reader 18 emits the signal 26 that is receivable within an area 64. In operation, when the user 60 brings the wearable device 14 within the area 64, the wearable device 14 is in communication with the second reader 18. As a result, the second RFID tag 30 of the wearable device 14 emits a backscatter that includes information that identifies the user. The second reader 18 sends this information to the computing system 20 to indicate that the user 60 has been detected by the second reader 18, and thus, has interacted with the target 58. Furthermore, the microcontroller 32 may receive a signal from the second RFID tag 30 that indicates that the second RFID tag 30 has communicated with the second reader 18 and may provide a corresponding feedback response (e.g., illuminate one or more LEDs).

It should be appreciated that the microcontroller 32 may be configured to generate a first control signal that causes a first feedback response in response to receipt of a signal from the first RFID tag 28 that indicates that the first RFID tag 28 has communicated with one of the first readers 16, to generate a second control signal that causes a second feedback response in response to receipt of a signal from the second RFID tag 30 that indicates that the second RFID tag 30 has communicated with the second reader 18, and to generate a third control signal that causes a third feedback response in response to receipt of signals that indicate that both the first RFID tag 28 and the second RFID tag 30 have communicated with respective readers (i.e., the first reader 16 and the second reader 18). The first, second, and third feedback responses may be different types of feedback responses, such as a type of illumination (e.g., number of lights, color, blinking pattern, length of time), a type of sound (e.g., volume, tone, beep pattern, length of time), or a type of haptics (e.g., intensity, length of time).

At certain times, the user 60 may not be in either area 62*a* or 62*b*, and thus, may not receive signals 24*a* and 24*b* from the first readers 16*a* and 16*b*. In one embodiment, the wearable device 14 may utilize power stored in the power circuitry 36 to continue to provide power (e.g., for 5, 15, 30, 60 or more seconds) even while outside of the areas 62*a* and 62*b*. Accordingly, the wearable device 14 may provide feedback (e.g., illuminate LEDs to indicate progress, wait time, or the like) even while the user is outside of the areas 62*a* and 62*b*, thereby providing more time for the user to observe the feedback response. In one embodiment, the feedback response (e.g., illumination of the LEDs) may stop when the user 60 leaves the area 62*a* defined by the signals 24*a* emitted from the first reader 16*a*.

Figure 3:
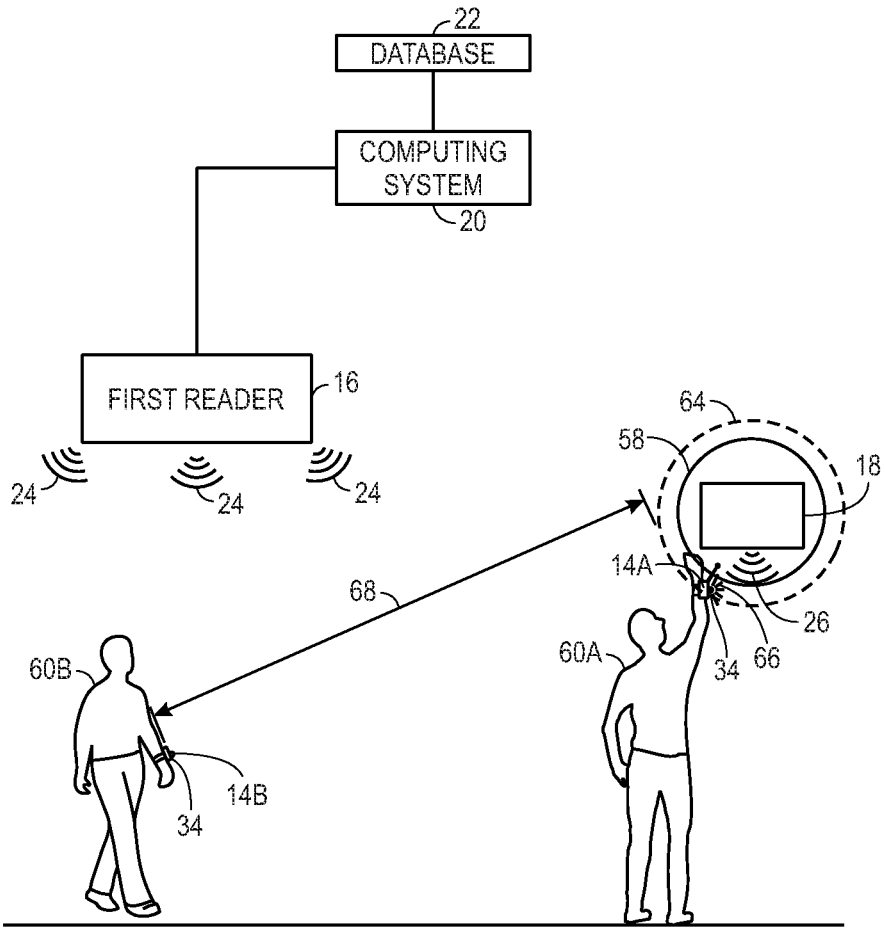
FIG. 3 is an illustration showing communication between a reader and multiple wearable devices that may be used in the interactive system of FIG. 1, in accordance with an embodiment of the present disclosure.

FIG. 3 is an illustration of one embodiment of the interactive system 10 including a first user 60*a*, a second user 60*b*, the second reader 18 disposed within or proximate to the target 58, and the first reader 16. The second reader 18 and the first reader 16 are communicatively coupled to the computing system 20 and the database 22. Additionally, the second reader 18 is emitting the signal 26 across the area 64. The first user 60*a* is wearing a first wearable device 14*a* including one or more LEDs 34, and the second user 60*b* is a wearing a second wearable device 14*b* including one or more LEDs 34. In one embodiment, the second reader 18 has a relatively small communication range, and thus, communicates with the wearable device 14 when the user makes physical contact with the target 58 containing the second reader 18 or when the wearable device 14 is otherwise brought within the area 64. Further, the first reader 16 has a relatively long communication range, and thus, is continuously communicating with the wearable devices 14*a* and 14*b* through electromagnetic radiation.

In operation, when the first user 60*a* makes contact with (e.g., touches or hits) the target 58 containing the second reader 18, the wearable device 14 provides feedback 66 through the illumination of the one or more LEDs 34. More specifically, the contact the first user 60*a* makes with the second reader 18 brings the first wearable device 14*a* (specifically, the second RFID tag 30 of the first wearable device 14*a*) within the range of the second reader 18. Because the second user 60*b* is at a distance 68 outside of the range of the second reader 18, the second user 60*b* does not receive feedback from the one or more LEDs 34 of the second wearable device 14*b*. In an embodiment, both the first user 60*a* and the second user 60*b* might both be within the range of the second reader 18 (e.g., by simultaneously contacting the target 58). In such cases, the LEDs 34 from both the first wearable device 14 and the second wearable device 14*b* would elicit a suitable feedback.

Figure 4:
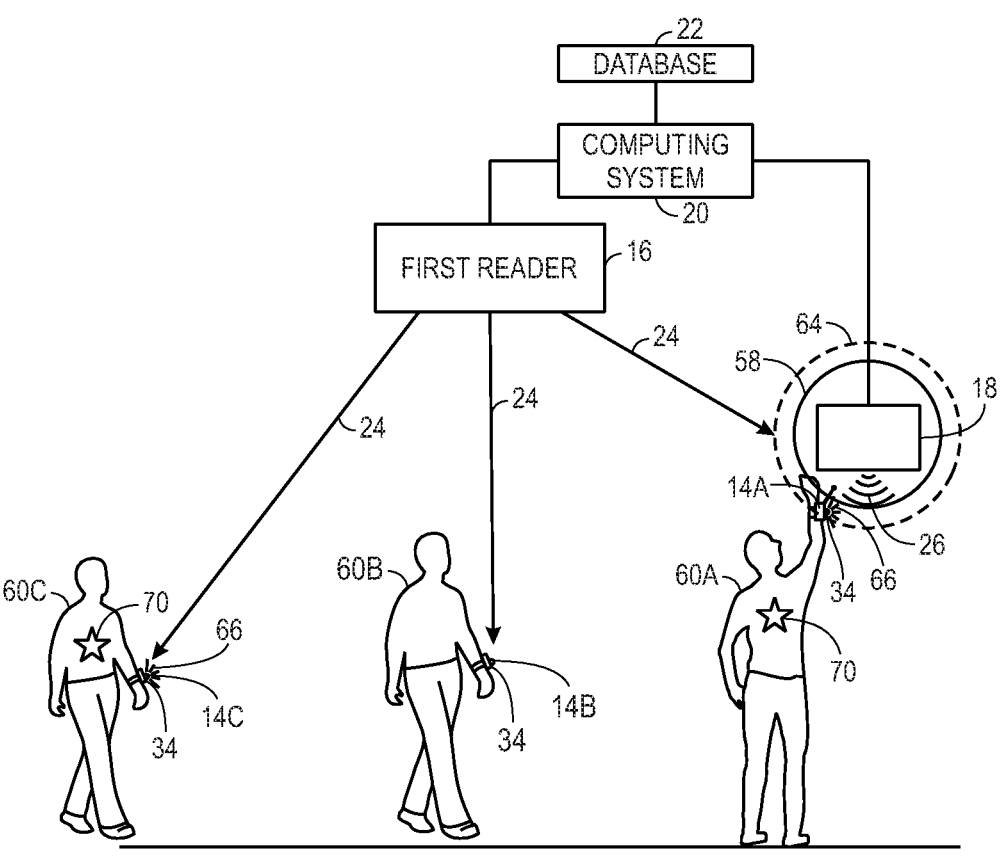
FIG. 4 is an illustration of a team feedback that may be provided by the interactive system of FIG. 1, in accordance with an embodiment of the present disclosure.

FIG. 4 shows an embodiment of the interactive system 10 illustrating a team feedback (e.g., feedback to multiple users that are designated or assigned to a team). As illustrated in FIG. 4, there is a first user 60*a*, a second user 60*b*, a third user 60*c*, the second reader 18, and the first reader 16. The second reader 18 and the first reader 16 are electronically coupled to the computing system 20 and the database 22. The first user 60*a*, the second user 60*b*, and the third user 60*c* have a first wearable device 14*a*, a second wearable device 14*b*, and a third wearable device 14*c*, respectively, which each have one or more LEDs 34. The first user 60*a* and the third user 60*c* are part of a team, and as such, may wear a team indicator 70 that distinguishes the first user 60*a* and the third user 60*c* from the second user 60*b*. In one embodiment, the team indicator may be a physical characteristic of the wearable device 14 (e.g., color, shape, pattern). In one embodiment, the team may be created or determined by the computing system 20 based on information stored in the database 22 (e.g., a family or other users linked together by characteristics, such as last name, age, group entering the attraction at the same time, game level; characteristics of the wearable devices 14; requests for team selection or assignment input by users). As such, the first user 60*a* and the third user 60*c* are on a first team (e.g., team A), and the second user is on a second team (e.g., team B).

As shown in FIG. 4, the first wearable device 14*a* worn by the first user 60*a* is within the area 64 to interact with the signal 26 emitted by the second reader 18. The second reader 18 receives information from the memory 40 of the second RFID tag 30 of the first wearable device 14*a* from the backscatter, as discussed above. The information is sent to the computing system 20, which then identifies the first user 60*a* based on the information. Additionally, based on the information stored in the database 22, the computing system 20 determines that the first user 60*a* is on team A. As a result, the computing system 20 sends a signal (e.g., control signal) instructing the first reader 16 to send electromagnetic radiation to the wearable devices 14*a*, 14*c* of the first and third users 60*a*, 60*c*, to write data to the memory 40 of the respective first RFID tags 28. The respective microcontroller 32 of each of the wearable devices 14*a*, 14*c* reads the data written to the memory 40 of the respective first RFID tags 28. The updated memory 40 includes data that, when read by the microcontroller 32, causes the microcontroller 32 to initiate a particular feedback response.

As illustrated, the feedback response is provided via illumination of the LEDs 34 of the first wearable device 14*a* and the third wearable device 14*c*. Thus, a single interaction between one user (e.g., the first user 60*a*) and the target 58 can result in all users on a team receiving feedback due to the interaction. In one embodiment, users of the same team may be in a different zone (e.g., not receiving signals from the same first reader 16) but may still receive feedback as all first readers 16 may be communicatively coupled to a computing system 20. In one embodiment, the feedback is only provided to users receiving signals 24 from the same readers 16. In one embodiment, all users of the same team regardless of which first reader 16 they are receiving the signal 24 from, receive the feedback.

Figure 5:
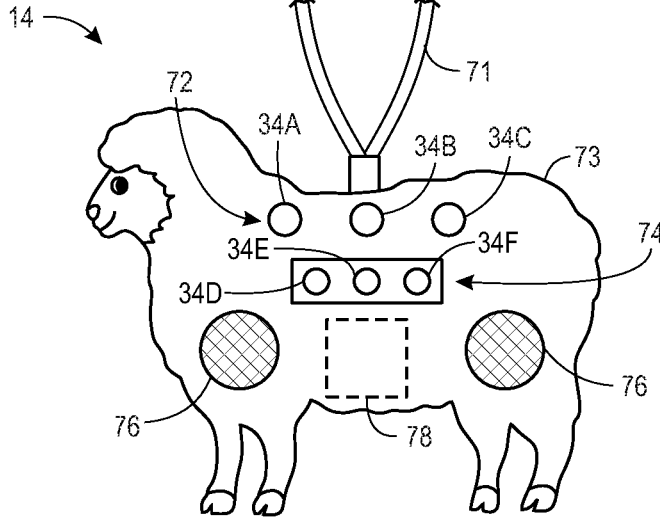
FIG. 5 is a front view of a wearable device that may be used in the interactive system of FIG. 1, in accordance with an embodiment of the present disclosure.

FIG. 5 shows an illustration of the wearable device 14, in accordance with an embodiment of the present techniques. While the wearable device 14 is shown with a lanyard 71 (e.g., rope or string) coupled to a housing 73, it should be appreciated that the wearable device 14 may have any suitable form. For example, the wearable device 14 may include a strap (e.g., to secure the housing 73 to a wrist of the user), or the wearable device 14 may be a charm or toy that is carried by the user. As shown, the wearable device 14 includes a first LED display 72, a second LED display 74, an audio device 76 (e.g., speaker), and haptics 78 (e.g., vibration device). Any combination of the LEDs 34, haptics 78, audio device 76, or other feedback devices might be activated to provide feedback to a user. It should be appreciated that the wearable device 14 may include only one of these feedback devices or any combination of these feedback devices.

As shown, the wearable device 14 may include multiple LED displays (e.g., the first LED display 72 and the second LED display 74), and each LED display may provide various types of feedback. For example, the first LED display 72 may provide feedback indicative of interactions with the one or more first readers 16 and/or the one or more second readers 18, while the second LED display 72 may provide feedback indicative of a wait time for an attraction. As illustrated in FIG. 5, the first LED display 72 and the second LED 74 display each include three LEDs (34*a-c* and 34*d-f*, respectively). In one embodiment, the wearable device 14 may include any number of LED displays with any number of LEDs (e.g., 1, 2, or more than 2 LED displays containing one or multiple LEDs). In one embodiment, a single LED display (e.g., the LED display 72) may provide some or all of the various types of feedback disclosed herein.

Figure 6:
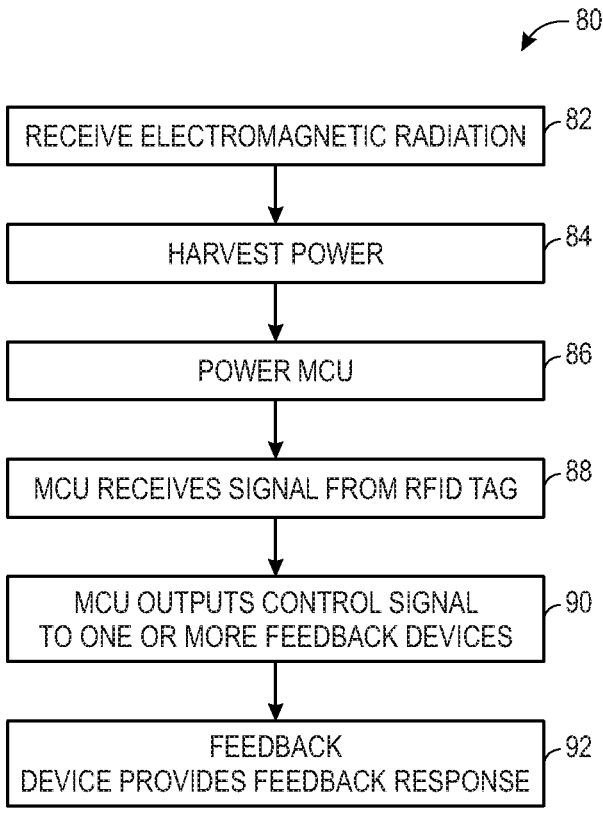
FIG. 6 is a flow diagram of a method of operating the interactive system of FIG. 1, in accordance with an aspect of the present disclosure.

FIG. 6 is a flow diagram illustrating one embodiment of a process 80 for operating the wearable device 14, in accordance with present techniques. It is to be understood that the steps discussed herein are merely exemplary, and certain steps may be omitted or added, and the steps may be performed in a different order. In one embodiment, the process 80 may be executed by the first RFID tag 28 and/or the second RFID tag 30 in cooperation with the microcontroller 32 of the wearable device 14.

The process 80 begins with the antenna 38 of the first RFID tag 28 and/or the second RFID tag 30 receiving electromagnetic radiation from a respective first reader 16 or second reader 18 (block 82). As discussed above, after the antenna 38 receives electromagnetic radiation, the antenna 38 returns a backscatter with information stored within the memory 40 of the RFID tag 28, 30 to the respective reader 16, 18. In one embodiment, this information may include an identification number that is specific to the wearable device 14, and thus, identifies a user (e.g., user using the wearable device 14). In one embodiment, the electromagnetic radiation emitted by the first reader 16 travels a relatively long distance, and the electromagnetic radiation emitted by the second reader 18 travels a relatively short distance. The first RFID tag 28 is capable of communicating with the first reader 16, and the second RFID tag 30 is capable of communicating with the second reader 18.

Once the wearable device 14 has received electromagnetic radiation, the wearable device 14 harvests power (block 84) from the electromagnetic radiation. As discussed above, the first RFID tag 28 and the second RFID tag 30 may each include an integrated circuit 44 that powers the microchip 42. Additionally, the integrated circuit 44 powers the power circuitry 36, which provides power to the microcontroller 32 (block 86) and other components of the wearable device (e.g., feedback devices). In one embodiment, the power circuitry 36 may include an energy storage device (e.g., capacitor, super capacitor, or battery) that is electrically coupled to a receiver coil and that stores power upon the wearable device 14 receiving signals from the first reader 16 and/or the second reader 18.

Once the microcontroller 32 is powered, the processor 48 executes the command stored in the memory 46 to receive and/or process signals from the first RFID tag 28 and/or second RFID tag 30 (block 88). In one embodiment, the microcontroller 32 may be programmed to continually or periodically query the first RFID tag 28 and/or the second RFID tag 30 when powered.

The microcontroller 32 then outputs a signal (e.g., control signal) to one or more feedback devices (block 90.) In one embodiment, the control signal may result in one or more of the LEDs 34 and/or other feedback devices (e.g., audio devices, haptics) being activated. In one embodiment, the control signal is a variable voltage applied to one LED 34, which results in a change in the intensity of the LED 34. In one embodiment, the signal is an oscillating voltage signal that results in the LED 34 blinking.

The feedback devices (e.g., LEDs, haptics, audio device) provide a feedback response to the user (block 92). The feedback response may be provided in response to interactions between the wearable device 14 and the reader systems 12 disposed in the attraction. For example, a feedback response may include lighting up one LED 34 to notify a user that they have entered a zone of the first reader 16 (e.g., the user's wearable device 14 is successfully communicating with the first reader 16) or successfully interacted with an interactive element, such as the target 58.

As noted above, the memory 40 of the first RFID tag 28 and/or the second RFID tag 30 may be written to by the first reader 16 and/or the second reader 18. Accordingly, the user may receive a feedback response upon achieving a goal based on information tracked in the database 22 (e.g., leveling up, reaching a high score). In one embodiment, a feedback response may result from a different user successfully achieving a goal (e.g., if the users are on the same team). In one embodiment, a feedback response may include one or more LEDs 34 that indicate a time (e.g., a wait time or a remaining time in an area of the attraction). In one embodiment, a feedback response may include a sound from an audio device 76 of the wearable device 14 to indicate that the user needs to perform an action (e.g., begin a race, move to the next zone, participate in a game, etc.) In one embodiment, an increasing volume of sound from the audio device 76, intensity of LED illumination, or intensity of haptic 78 might indicate progression toward a goal in the attraction, for example.

Accordingly, the present disclosure is directed to an interactive system having a reader system and a wearable device that emits a feedback response based on the communication between RFID tags of the wearable device and readers of the reader system. More specifically, the reader system includes readers (e.g., one or more first readers 16 and one or more second readers 18) that, in operation, communicate (e.g., transmit and receive signals) with a first RFID and a second RFID of a wearable device through electromagnetic radiation. The readers continuously emit electromagnetic radiation within a range (e.g., communication range), and upon the wearable device entering that range, the readers communicate with the wearable device. For example, one reader (e.g., the first reader) may have a communication range that is larger than the communication range of another reader (e.g., the second reader). As such, the first reader generally communicates with the first RFID of the wearable device more often and/or at different times than the second reader communicates with the second RFID. A reader that communicates with a RFID tag more regularly, or for longer periods of time, may be more suitable for powering a power harvesting device, and thus, enabling feedback devices (e.g., audio devices, haptics, one or more LEDS) to be included in the wearable device that may need more power to operate. In one embodiment, the RFID readers are disposed in stationary targets that guests can interact (e.g., touch or hit). In one embodiment, the RFID readers are disposed in moveable targets (e.g., disposed within the costume of a character at an amusement park). While the embodiments disclosed herein include two RFID readers having two different communication ranges, it should be appreciated that any number of readers (e.g., 1, 2, 3, 4, 5 or more readers) configured to have any number of different communication ranges (e.g., 1, 2, 3, 4, 5 or more different communication ranges) may be provided within the system. Furthermore, the wearable device may include any number of RFID tags (e.g., 1, 2, 3, 4, 5 or more RFID tags) configured to communicate with the various readers to provide the functionality disclosed herein.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to FIGS. 1-6 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A wearable device comprising:
a radio-frequency identification (RFID) tag;
one or more feedback devices configured to provide feedback to a user to indicate progression of the user within an attraction; and
a microcontroller configured to control the one or more feedback devices to:
provide a first type of the feedback in response to a total number of a plurality of occurrences of RFID tag interactions passing a first threshold number of occurrences; and
provide a second type of the feedback in response to the total number of the plurality of occurrences of RFID tag interactions passing a second threshold number of occurrences:
wherein the RFID tag interactions are between the RFID tag and electromagnetic radiation within a frequency range such that the first type of the feedback provides a first indication of a first number of occurrences of wearable device interactions between the wearable device and interactive elements within the attraction and the second type of the feedback provides a second indication of a second number of occurrences of wearable device interactions between the wearable device and interactive elements within the attraction.

2. The wearable device of claim 1, wherein the microcontroller is configured to control the one or more feedback devices to provide an additional type of the feedback in response to and during a particular RFID tag interaction between the RFID tag and the electromagnetic radiation within the frequency range to indicate occurrence of a particular wearable device interaction with an interactive element of the interactive elements within the attraction.

3. The wearable device of claim 1, comprising a power harvesting circuit configured to harness power from the electromagnetic radiation within the frequency range and supply the harnessed power to the one or more feedback devices.

4. The wearable device of claim 3, comprising an energy storage device configured to store the harnessed power.

5. The wearable device of claim 1, wherein the one or more feedback devices comprise a speaker, a haptic feedback device, or both.

6. The wearable device of claim 1, wherein the one or more feedback devices comprise a light emitter.

7. The wearable device of claim 1, wherein the one or more feedback devices comprise a plurality of light emitters configured to emit light, and the microcontroller is configured to:
control the plurality of light emitters to cause a first number of the plurality of light emitters to emit the light as the first type of the feedback in response to the total number of the plurality of occurrences of RFID tag interactions, between the RFID tag and the electromagnetic radiation within the frequency range, passing the first threshold number of occurrences; and
control the plurality of light emitters to cause a second number of the plurality of light emitters to emit the light as the second type of the feedback in response to the total number of the plurality of occurrences of RFID tag interactions, between the RFID tag and the electromagnetic radiation within the frequency range, passing the second threshold number of occurrences.

8. The wearable device of claim 1, wherein the RFID tag is a read/write RFID tag, and the microcontroller is configured to access data indicative of the total number of the plurality of occurrences of RFID interactions from a memory of the RFID tag.

9. The wearable device of claim 1, comprising an additional RFID tag, wherein the RFID tag is configured to respond to near-high frequency (NFC) electromagnetic radiation within the frequency range and the additional RFID tag is configured to respond to ultra-high frequency (UHF) electromagnetic radiation within a different frequency range.

10. The wearable device of claim 1, wherein the first type of the feedback is a first volume of sound and the second type of the feedback is a second volume of sound.

11. A feedback system for use in an attraction, the feedback system comprising:
a plurality of readers within the attraction, wherein each reader of the plurality of readers is associated with a respective interactive element of a plurality of interactive elements in the attraction and is configured to transmit electromagnetic radiation within a frequency range;
a wearable device configured to be worn by a user within the attraction, the wearable device comprising:
a radio-frequency identification (RFID) tag comprising a memory that stores identification information and that is readable by each reader of the plurality of readers;
a plurality of light emitters configured to emit light indicative of progression of the user within an attraction; and
a microcontroller configured to control the plurality of light emitters to emit the light; and
a computing system configured to:
track a total number of a plurality of occurrences of wearable device interactions between the wearable device and the plurality of interactive elements in the attraction based on a total number of times the identification information of the RFID tag is read by the plurality of readers; and
instruct at least one reader of the plurality of readers to write data indicative of the total number of the plurality of occurrences of wearable device interactions between the wearable device and the plurality of interactive elements in the attraction to the memory of the RFID tag;
wherein the microcontroller is configured to access the data from the memory of the RFID tag and to control a first subset of the plurality of light emitters to emit light as a first type of feedback to indicate the total number of the plurality of occurrences of wearable device interactions, between the wearable device and the plurality of interactive elements within the attraction, meets or exceeds a first threshold number of occurrences and to control a second subset of the plurality of light emitters to emit light as a second type of feedback to indicate the total number of the plurality of occurrences of wearable device interactions, between the wearable device and the plurality of interactive elements within the attraction, meets or exceeds a second threshold number of occurrences.

12. The feedback system of claim 11, comprising a speaker, wherein microcontroller is configured to:

control the speaker to output a first sound as the first type of feedback to indicate that the total number of the plurality of occurrences of wearable device interactions between the wearable device and the plurality of interactive elements within the attraction meets or exceeds the first threshold; and control the speaker to output a second sound as the second type of feedback to indicate that the total number of the plurality of occurrences of wearable device interactions between the wearable device and the plurality of interactive elements within the attraction meets or exceeds the second threshold.

13. The feedback system of claim 11, wherein the microcontroller is configured to control the plurality of light emitters to emit light as a third type of feedback in response to receipt of the electromagnetic radiation within the frequency range at the RFID tag.

14. The feedback system of claim 11, wherein the computing system is configured to store and to associate the total number of the plurality of occurrences of wearable device interactions between the wearable device and the plurality of interactive elements in the attraction with the identification information in a database.

15. The feedback system of claim 11, comprising a plurality of additional readers within the attraction, wherein each additional reader of the plurality of additional readers is configured to transmit electromagnetic radiation within another frequency range, and the wearable device comprises an additional RFID tag that is readable by each additional reader of the plurality of additional readers.

16. A method for providing feedback to a user within an attraction, the method comprising:

transmitting electromagnetic radiation within a frequency range from a reader associated with an interactive element in the attraction;

transmitting identification information from a radio-frequency identification (RFID) tag supported by a wearable device carried by the user to the reader in response to receipt of the electromagnetic radiation within the frequency range;

updating, using one or more processors that are communicatively coupled to the reader, a total number of a plurality of occurrences of the wearable device providing the identification information to the reader in response to receipt of the identification information at the reader;

writing, using the reader or an additional reader, data indicative of the total number of the plurality of occurrences of the wearable device providing the identification information to the reader to a memory accessible by a microcontroller of the wearable device; and controlling, using the microcontroller and in response to the data being written to the memory, one or more feedback devices supported by the wearable device to provide a first type of feedback indicative of the total number of the plurality of occurrences of the wearable device meeting or exceeding a first threshold and a second type of feedback indicative of the total number of the plurality of occurrences of the wearable device meeting or exceeding a second threshold such that the first type of feedback and the second type of feedback are indicative of progression of the user within the attraction.

17. The method of claim 16, wherein the one or more feedback devices comprise a plurality of light emitters, and the method comprises controlling, using the microcontroller and in response to the data being written to the memory, the plurality of light emitters to provide the first type of feedback and the second type of feedback.

18. The method of claim 16, comprising:

comparing, using the one or more processors, the total number of the plurality of occurrences to the first threshold; and writing, using the reader or the additional reader, the data indicative of the total number of the plurality of occurrences to the memory accessible by the microcontroller of the wearable device in response to determining that the total number of the plurality of occurrences exceeds the first threshold.

19. The method of claim 16, comprising controlling, using the microcontroller, the one or more feedback devices to provide a third type of feedback in response to receipt of the electromagnetic radiation within the frequency range at the RFID tag.

20. The method of claim 16, comprising:

comparing, using the one or more processors, the total number of the plurality of occurrences to the second threshold; and writing, using the reader or the additional reader, the data indicative of the total number of the plurality of occurrences to the memory accessible by the microcontroller of the wearable device in response to determining that the total number of the plurality of occurrences exceeds the second threshold.

\* \* \* \* \*